United States Patent [19]

Zaiser et al.

[11] 4,050,329
[45] Sept. 27, 1977

[54] PLANETARY GEAR CHANGE-SPEED TRANSMISSION FOR VEHICLES

[75] Inventors: Wolfgang Zaiser, Althutte; Helmut Diegelmann, Grunbach, both of Germany

[73] Assignee: Daimler-Benz Aktiengesellschaft, Germany

[21] Appl. No.: 287,218

[22] Filed: Sept. 8, 1972

[30] Foreign Application Priority Data

Sept. 9, 1971 Germany .............................. 2145107

[51] Int. Cl.² .......................................... F16H 3/44
[52] U.S. Cl. .............................. 74/750 R; 74/781 R;
192/85 CA
[58] Field of Search ................... 74/781, 781 R, 785,
74/789, 750 R; 192/85 CA

[56] References Cited

U.S. PATENT DOCUMENTS

| 2,242,519 | 5/1941 | Frank | 74/781 R X |
| 2,403,579 | 7/1946 | Carpenter | 74/781 R X |
| 3,273,674 | 9/1966 | Snyder | 74/785 X |
| 3,513,722 | 5/1970 | Mori et al. | 74/695 |
| 3,602,055 | 8/1971 | Hause et al. | 74/759 |
| 3,611,835 | 10/1971 | Borman | 74/759 |

Primary Examiner—Samuel Scott
Assistant Examiner—Lance W. Chandler
Attorney, Agent, or Firm—Craig & Antonelli

[57] ABSTRACT

A planetary gear change-speed transmission for vehicles, especially an automatically shifting change-speed transmission for motor vehicles in which a frictional engaging device and a free-wheeling device are arranged at the planetary gear set coordinated to the output and in which the frictional engaging device is actuatable by an actuating piston that is arranged in an annular cylinder of a housing part, which simultaneously takes over the free-wheeling support; the output shaft drives a controller whose feed and discharge lines are transferred into the transmission housing by means of a sleeve-like extension at the controller; a support flange is inserted into the transmission housing from the input side thereof and is secured at an annular flange of the transmission housing while a sleeve portion of the support flange facing the input is provided at its inner circumference with the transfer means for the pressure medium lines to and from the controller.

10 Claims, 1 Drawing Figure

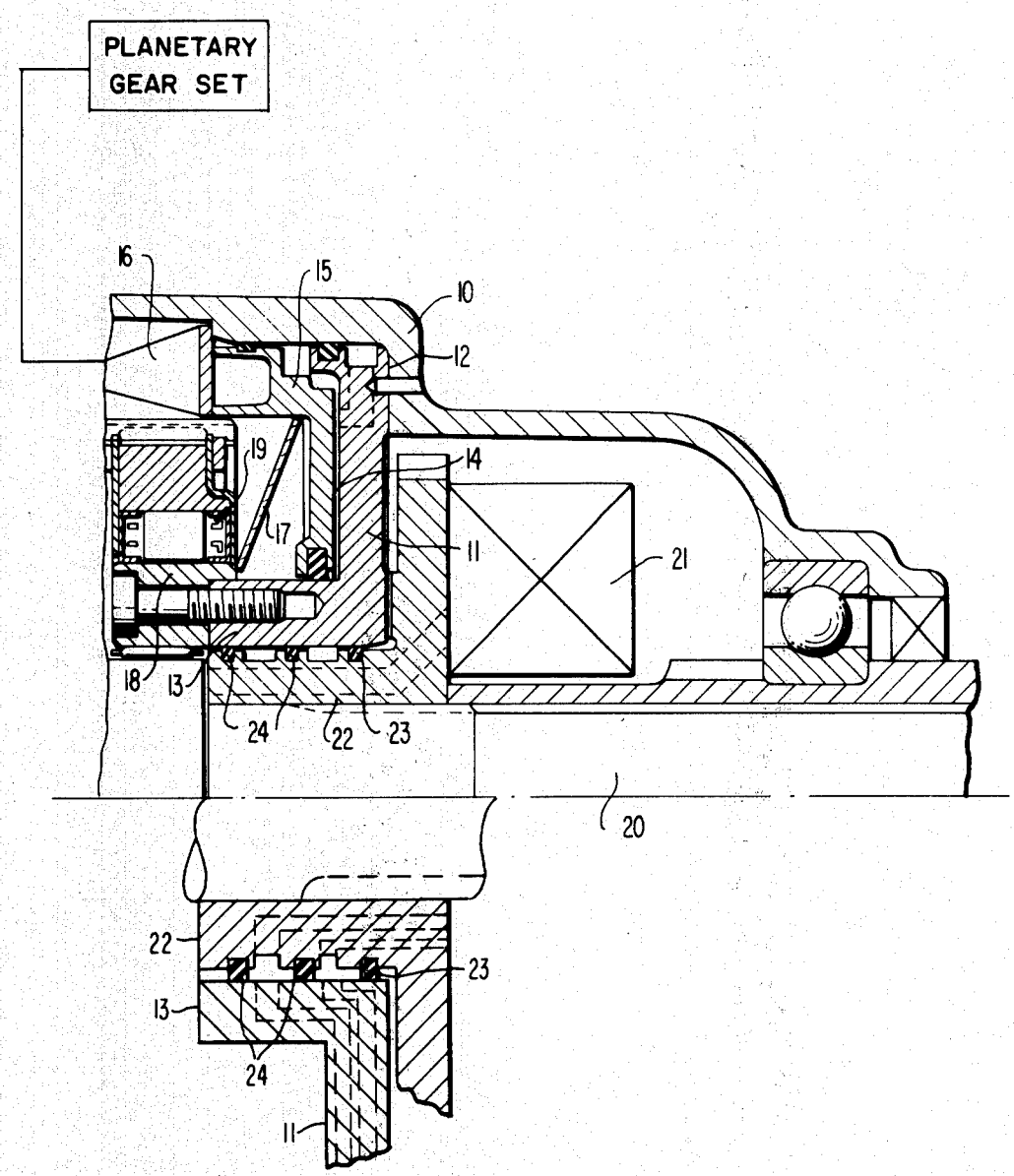

PLANETARY GEAR CHANGE-SPEED TRANSMISSION FOR VEHICLES

The present invention relates to a planetary gear change-speed transmission for vehicles, especially to an automatically shifting change-speed transmission for motor vehicles, in which a frictional engaging device and a free-wheeling device are arranged at the planetary gear set coordinated to the output or driven side and in which the frictional engaging device is actuatable by an actuating piston which is arranged in an annular cylinder of the transmission housing or of a housing portion, which simultaneously takes over the free-wheeling support, and in which the output shaft drives a controller whose feed and discharge lines are transferred into the transmission housing by means of a sleeve-like extension at the controller.

In one prior art transmission of the aforementioned type, the transmission housing itself forms the annular cylinder for the actuating piston of the frictional engaging device at the last planetary gear set. A separate housing part includes a sleeve portion directed toward the output or driven side which takes over the transfer of the feed and discharge lines to and from the controller. In another transmission known in the prior art, a separate housing part forms simultaneously the annular cylinder for the actuating piston and the sleeve portion for the transfer of the feed and discharge lines to and from the controller, however, both of these parts are disposed axially opposite with respect to one another. Consequently, both prior art transmissions require a considerable space in the axial direction.

The present invention is concerned with the task to avoid the aforementioned disadvantage. Accordingly, an arrangement is proposed which primarily entails a space saving and by means of which additionally the construction is to be simplified.

The underlying problems are solved in accordance with the present invention with the transmissions of the aforementioned type in that a support flange is inserted into the transmission housing from the input or driving side thereof and is secured at an annular surface of the transmission housing, and in that a sleeve portion of this support flange, which faces the input or driving side is provided at its inner circumference with the transfer means of the pressure medium lines from and to the controller.

The construction according to the present invention shortens the axial structural length of the transmission by a considerable amount. Additionally, it becomes possible thereby to construct the transmission housing altogether in one piece. Also, a better matching of the actuating piston to different engine torques is possible by means of the inserted support flange—which can be readily exchanged for a support flange with different dimensions. As a result thereof, the same transmission housing can be utilized for several engine types in the manner of a building-block system.

A further feature of the present invention resides in that the actuating piston of the frictional engaging device is arranged between the outer circumference of the sleeve portion at the support flange and the housing concentrically about the pressure medium transfer place.

Furthermore, it is additionally proposed according to the present invention that a plate or cup spring is arranged as return spring for the actuating piston at the outer circumference of the sleeve portion at the support flange concentrically about the pressure medium transfer place, which cup spring is supported with its inner circumference at an end-face abutment surface of the free-wheeling inner ring or race. Also, this construction contributes to an advantageous axial shortening of the transmission.

Accordingly, it is an object of the present invention to provide a planetary gear change-speed transmission for vehicles which avoids by simple means the aforementioned shortcomings and drawbacks encountered in the prior art.

Another object of the present invention resides in a planetary gear change-speed transmission for vehicles, especially automatically shifting change-speed transmissions for motor vehicles, which permits a considerable saving of space in the axial direction.

A further object of the present invention resides in a vehicle change-speed transmission which not only results in space saving, but additionally permits simplification in its structure.

Still a further object of the present invention resides in a change-speed transmission of the type described above which permits a one-piece construction of the transmission housing while utilizing the same basic construction for different engine types by merely changing one part for another part of different dimensions.

Another object of the present invention resides in a change-speed transmission for motor vehicles provided with frictional engaging means which permits to utilize the same transmission housing for several engine types in the manner of a building-block system.

These and other objects, features and advantages of the present invention will become more apparent from the following description when taken in connection with the accompanying drawing which shows, for purposes of illustration only, one embodiment in accordance with the present invention, and wherein:

The single FIGURE is a partial longitudinal cross-sectional view through a motor vehicle change-speed transmission in accordance with the present invention.

Referring now to the single FIGURE of the drawing, reference numeral 10 designates therein the one-piece transmission housing. A support flange 11 is inserted into the transmission housing 10 from the input or driving side thereof, i.e., from the left as viewed in the drawing, which at the outer circumference thereof is secured by conventional means at an annular surface 12 of the transmission housing 10, for example, by a threaded connection indicated only schematically. The transmission housing 10 is thereby made in one piece. The support flange 11 is provided at the inner circumference with a sleeve portion 13 which is directed toward the input side. An annular cylinder 14 is formed between the sleeve portion 13 and the transmission housing 10, in which is arranged the actuating piston 15 of a frictional engaging device 16 constructed as a brake for a planetary gear set (not shown) of conventional construction. A cup spring 17—which is supported at the inner circumference thereof at the inner ring or race 18 of the free-wheeling device generally designated by reference numeral 19—forms the return spring for the actuating piston 15. The free-wheeling device 19 serves also for the purpose of shifting the planetary gear set (not shown).

The output shaft 20 of the transmission drives a controller 21 of conventional construction and therefore only indicated schematically, which projects with a sleeve-like extension 22 directed toward the input side into the sleeve portion 13 of the support flange 11. The sleeve portion 13 is provided at its inner circumference with the transfer means for the pressure medium feed and discharge lines to and from the controller 21. These lines are separated with respect to one another by means of seals 23, 24.

It can be readily seen from the drawing that the actuating piston 15 is arranged concentrically about the transfer place of the pressure medium lines. Also, the cup spring 17 is disposed concentrically with respect to both parts so that—from an over-all point of view—the transmission can be constructed very short in the axial direction.

While we have shown and described only one embodiment in accordance with the present invention, it is understood that the same is not limited thereto but is susceptible of numerous change and modifications as known to those skilled in the art, and we therefore do not wish to be limited to the details shown and described herein but intend to cover all such changes and modifications as are encompassed by the scope of the appended claims.

We claim:

1. A planetary gear change-speed transmission for vehicles, which includes input and output means, transmission housing means including a fixed annular surface means, a planetary gear set operatively connected with the output means, a frictional engaging means and a free-wheeling means operatively connected with the planetary gear set, the frictional engaging means being actuable by an actuating piston means arranged in an annular cylinder, the output means driving a controller means, and feed and discharge lines leading to and from the controller means, the improvement comprising: a sleeve-like extension provided at the controller means and extending in a direction of the input means of the transmission, the feed and discharge lines to and from the controller means being disposed in said sleeve-like extension, a support flange means for supporting the frictional engaging means, the free-wheeling means and the actuating piston means, said support flange means being inserted into the transmission housing means from the input side thereof, said support flange means having an annular portion secured to a fixed annular surface of the transmission housing means and a sleeve portion at an inner circumference of the annular portion facing the input means of the transmission, said sleeve portion surrounding said sleeve-like extension and engaging at least portions thereof, said sleeve portion being provided at its inner circumference with transfer means for transferring the pressure medium to and from the feed and discharge lines leading to and from the controller means.

2. A transmission according to claim 1, wherein the annular cylinder is defined between a portion of said transmission housing means, said annular portion of said support flange and said sleeve portion.

3. A transmission according to claim 2, wherein the transmission is an automatically shifting change-speed transmission for motor vehicles.

4. A transmission according to claim 2, wherein said actuating piston means of said frictional engaging means is disposed concentrically about said pressure medium transfer means and extends between an outer circumference of said sleeve portion and said transmission housing means.

5. A transmission according to claim 4, wherein the free-wheeling means is provided with an abutment surface and wherein a cup spring means is provided as a return spring for said actuating piston means, said cup spring means being disposed at the outer circumference of said sleeve portion substantially concentrically about said pressure medium transfer means, said cup spring means being supported with its inner circumference at an end face of said abutment surface of the free-wheeling means.

6. A transmission according to claim 5, wherein said abutment surface is provided at an inner ring of the free-wheeling means and wherein said cup spring means is supported at an end face of said abutment surface of said inner ring of the free-wheeling means.

7. A transmission according to claim 6, wherein said actuating piston means is disposed concentrically about said pressure medium transfer means and extends between an outer circumference of said sleeve portion and said transmission housing means.

8. A transmission according to claim 7, wherein the free-wheeling means is provided with an abutment surface and wherein a cup spring means is provided as return spring for said actuating piston means, said spring means being disposed at the outer circumference of said sleeve portion substantially concentrically about said pressure medium transfer means, said cup spring means being supported with its inner circumference at an end face of said abutment surface of the free-wheeling means.

9. A transmission according to claim 1, wherein said actuating piston means is disposed concentrically about said pressure medium transfer means and extends between an outer circumference of said sleeve portion of said support flange means and said transmission housing means.

10. A transmission according to claim 9, wherein the free-wheeling means is provided with an abutment surface and wherein a cup spring means is provided as a return spring for the actuating piston means, said spring means being disposed at the outer circumference of said cup sleeve portion of said support flange means substantially concentrically about said pressure medium transfer means, said cup spring means being supported with its inner circumference at an end face of said abutment surface of the free-wheeling means.

* * * * *